Dec. 11, 1962    P. S. DELL'ARIA    3,068,472
METHOD OF BLOWING RADAR-REFLECTIVE DIPOLES ASTERN
OF A MOVING SEAGOING SHIP
Filed June 8, 1959
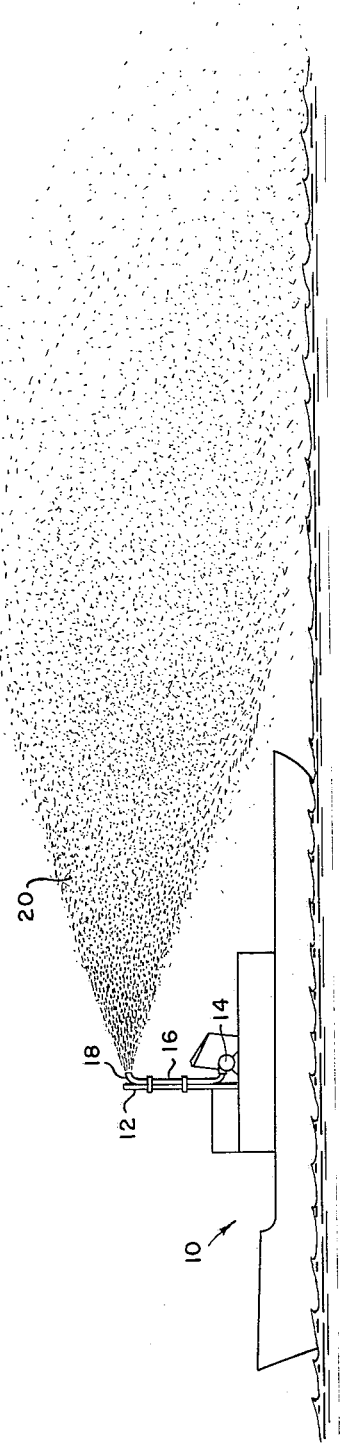
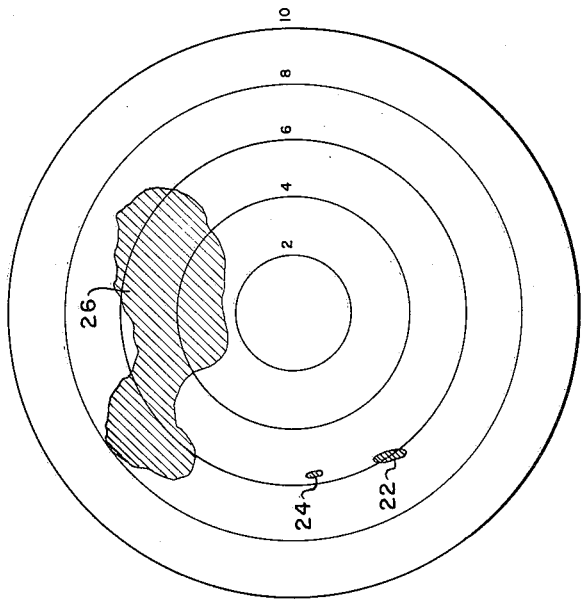
INVENTOR
PAUL S. DELL'ARIA
BY
ATTORNEYS

United States Patent Office 3,068,472
Patented Dec. 11, 1962

3,068,472
METHOD OF BLOWING RADAR-REFLECTIVE DI-POLES ASTERN OF A MOVING SEAGOING SHIP
Paul S. Dell'Aria, Arlington, Va., assignor to the United States of America as represented by the Secretary of the Navy
Filed June 8, 1959, Ser. No. 818,977
6 Claims. (Cl. 343—18)
(Granted under Title 35, U.S. Code (1952), sec. 266)

The invention described herein may be manufactured and used by or for the Government of the United States of America for governmental purposes without the payment of any royalties thereon or therefor.

This invention relates to a radar reflective means and method and more particularly to a means and method for producing large, false radar target images.

The advent of radar, has of course brought about a need for radar countermeasures. One countermeasure has been the attempt to create false target images on an enemy radar scope so as to either conceal or disguise the actual target. Various approaches to this problem have been taken including the use of a number of floating so-called "corner-targets", which are of a fairly substantial size. The reflection from such radar corner targets will produce an image on a radar screen which might be misinterpreted to be a ship and thus provide a countermeasure device. However, it has been found that corner targets, being of as large a size as they are, cannot be placed in such concentrated numbers as to produce a single image that will appear as a ship or a large mass of land on a radar-scope. In addition, it has been found, that targets that float on the water fail to produce an image likely to prove deceptive to an enemy, thus new and more desirable methods have of necessity had to be developed.

The instant invention provides a means and method for producing a false target image on a radar screen and comprises the spreading over water of a large, fairly concentrated mass of radar reflective dipoles in such a way that said dipoles will remain above the surface of the water for a reasonable length of time thus creating a cloud of dipoles. Radar waves are reflected from the cloud of dipoles causes a false target image on a radar screen which may suggest itself as either a large ship, a string of ships or a land mass. At any rate the target created will require that enemy detecting vessels and/or planes be required to investigate the same.

It is an object of this invention to provide a radar countermeasure adapted to overcome the inherent disadvantages of the prior art devices and methods.

It is another object of this invention to provide a radar-reflective material adapted to be used as part of a radar countermeasure technique.

An additional object of this invention is to provide a means and method of presenting large, false radar targets on an enemy radar screen.

Still an added object of this invention is to provide a means and method adapted to produce false radar images on an enemy radar screen, which resemble a plurality of surface vessels when in reality there is only one vessel.

A further object of this invention is to provide a means and method for screening surface vessels from radar detection.

Other objects and many of the attendant advantages of this invention will be readily appreciated as the same becomes better understood by reference to the following detailed description when considered in connection with the accompanying drawing wherein:

FIG. 1 is an elevational view showing the manner in which a ship is utilized in practicing the instant invention; and FIG. 2 is a reproduction of a radar screen, illustrating the effects of the instant invention thereon.

Referring now to the drawings wherein like reference characters designate like or corresponding parts throughout the several views, there is shown in FIG. 1 a ship 10 modified in such a manner as to carry out the instant invention, including the addition of a mast 12.

The high mast 12 extends a substantial distance above the superstructure of the ship. The ship 10 is further modified by attaching thereto a conventional blower 14 having a tube 16 extending therefrom and attached to the mast 12. The tube 16 extends substantially the length of the mast and has at its uppermost end a rearwardly directed portion 18.

The instant inventive process is carried out by feeding quantities of radar reflective dipoles into the blower 14 and having said material ejected from the upper end 18 of the tube 16 so as to be directed rearwardly of the ship, to create a dipole cloud 20 as the ship proceeds forwardly through the water.

It has been found that the most desirable effects are obtained from the instant process when the dipoles are of such a size and weight that they have a relatively slow falling rate through the air before striking the water. It has been definitely established that the most beneficial radar screening effects are obtained from the dipoles while they are in the air, rather than on the surface of the water, thus it is desirable to provide dipoles having a relatively slow falling rate.

It has further been noted that various false radar images may be obtained depending upon the falling rate of the dipoles. More specifically, it has been found that those dipoles which remain in the air the longest and thus stretch farthest behind the ship tend to produce more greatly elongated radar screen images than do dipoles that fall rapidly to the water. Thus by judiciously selecting the type of dipole used, it is possible to obtain a radar screen image 22 which appears to take on the form of a land mass. A radar image 24 represents the ship 10 just before commencement of the instant process, thus it can be seen that as the process continues the image elongates to show an image such as 22. A conventional land mass of a rather large nature would appear on the radar screen as an image 26. It is emphasized that FIG. 2 represents an accurate reproduction of an actual radar image produced in carrying out the instant invention.

It is emphasized that various types of radar reflective dipoles may be used in practicing the instant method, and the following are cited, primarily as examples only. In the use of X-band or 3 centimeter radar, the dipoles of course are of half wave-length and thus are 1½ centimeters long. In the case of S-band or 10 centimeter radar the dipoles are each 5 centimeters long.

Various types of physical construction of dipoles have been utilized. For example, one type of dipole comprises a thin plastic strand 1½ centimeters long in the case of 3 centimeter radar, having a cross-sectional dimension of .003 inch x .005 inch, said plastic strand being coated with aluminum. Another type of dipole is round in cross-section, is the same length as the one described above, has a diameter of .0035 inch and is of a plastic base having a silver coating.

To illustrate the manner in which the instant invention is practiced and the results obtained thereby, the following information is cited by way of example:

A ship 35 feet in length was utilized, and the dipoles were packed in round packages 4½ inches in diameter by 1½ centimeters in length, that is, the length of a single dipole, said dipoles being in effect stacked on end. Such a package contains $6 \times 10^6$ dipoles. The ship ran at a rate of 12 knots for a distance of one mile dispersing ten of the aforementioned packages of dipoles or $60 \times 10^6$ dipoles, weighing a total of about two pounds, in a distance of one mile at the aforementioned speed. Under the aforementioned conditions the dipole cloud 20 was maintained in the air astern of the ship by virtue of air turbulence, and was found to produce, on X-band radar PPI presentation, an image corresponding to a target 1 mile to 1½ miles in length and 500 feet in width. It is emphasized that although the radar cross-section of the image is rather small, it is of such a size that it represents a target that requires investigation by a search vessel and thus in effect serves to screen the real target and present a false radar target.

It is pointed out that the instant invention is adapted not only to present the impression of either land images or large groups of ships, but also may be utilized to in effect, lengthen a ship insofar as the radar presentation is concerned. This latter effect is produced by using dipoles 1½ centimeters in length, in the case of X-band or 3 centimeter radar, but which are of aluminum strip material having substantially greater weight per dipole than the dipoles described above. The heavier dipoles were found, under the circumstances of distribution described above, to have a falling rate of 120 feet per minute and thus has the effect of lengthening the ship insofar as a radar screen presentation is concerned. In carrying out this embodiment of the inventive process a window cloud of dipoles 500 to 1,000 feet long is produced by dispersing one package consisting of 550,000 dipoles, 1½ centimeters in length, at a ship speed of 12 knots, in a distance of 1/10 of one mile.

It is pointed out that the aforementioned lightweight dipoles have a falling rate of only 30 feet per minute and thus remain in the air a considerably longer period of time than do heavier dipoles and thus produce a longer radar cloud at the stern of the ship.

Thus the instant process, namely the dispersal of radar reflective dipoles astern of a moving ship results in said dipoles constituting a radar reflective cloud astern of said ship, and above the surface of the water. The cloud in turn produces a false radar image on a radar detection screen, thereby serving to screen the actual ship from radar detection and to cause unnecessary and time consuming search operations on the part of an enemy. It is reemphasized that the instant method also provides a means for producing radar screen images which may take the form of either a land mass representation or have the effect of lengthening the ship.

It should be understood, of course that the foregoing disclosure relates to only preferred embodiments of the invention and that numerous modifications or alterations may be made therein without departing from the spirit and scope of the invention as set forth in the appended claims.

What is claimed is:

1. A method of presenting a false radar image on a radar scope comprising, blowing from a moving seagoing ship a quantity of radar reflective dipoles astern of said moving ship and above the surface of the water at a rate of $60 \times 10^6$ dipoles per mile of ship's run so as to create a radar reflective cloud of dipoles.

2. A method of presenting a false radar image on a radar scope comprising, blowing from a moving seagoing ship a quantity of radar reflective dipoles astern of said moving ship and above the surface of the water, said dipoles being of such a dimension and weight that they have a falling rate greater than zero feet per minute and less than 30 feet per minute thereby creating a radar reflective cloud of said dipoles.

3. A method as set forth in claim 2 wherein, each of said dipoles is equal in length to half the wave length of the radar waves to be reflected thereby and has a cross-section .003 inch x .0005 inch.

4. A method as set forth in claim 2 wherein, each of said dipoles is equal in length to half the wave length of the radar waves to be reflected thereby and has a round cross-section .0035 inch in diameter.

5. A method of presenting a false radar image on a radar scope comprising, blowing a quantity of radar reflective dipoles astern from a moving seagoing ship and above the surface of the water, said dipoles being of such a dimension and weight as to have a falling rate greater than 30 feet per minute and less than 120 feet per minute thereby creating a radar reflective cloud of dipoles.

6. A method of presenting a false radar image on a radar scope comprising, blowing a quantity of radar reflective dipoles astern from a moving seagoing ship and above the surface of the water at a rate of 550,000 dipoles per 1/10 mile of ship's run, whereby the image produced on the radar scope has the effect of lengthening the size of the ship dispersing said dipoles.

References Cited in the file of this patent

UNITED STATES PATENTS

| | | |
|---|---|---|
| 2,756,948 | Winzen et al. | July 31, 1956 |
| 2,881,425 | Gregory | Apr. 7, 1959 |

OTHER REFERENCES

Radiocraft, pp. 235 and 290, January 1946.

Electronics, pp. 92–97, January 1946.

Schivley, George W.: "History of Chaff Development," WADC Technical Note 59–6, January 1959, 11 pp. (Photocopy in Div. 44.) Wright Air Development Center, Wright-Patterson Air Force Base, Ohio.